United States Patent
Ong et al.

(10) Patent No.: US 7,633,952 B2
(45) Date of Patent: Dec. 15, 2009

(54) DISCOVERY OF PHYSICALLY ADJACENT NEIGHBOR DEVICES USING A UNIDIRECTIONAL IN-BAND PROCESS COUPLED WITH AN OUT-OF-BAND FOLLOW-UP PROCESS

(75) Inventors: Lyndon Y. Ong, Sunnyvale, CA (US); Rajender Razdan, N. Potomac, MD (US)

(73) Assignee: Ciena Corporation, Linthicum, MD (US)

( * ) Notice: Subject to any disclaimer, the term of this patent is extended or adjusted under 35 U.S.C. 154(b) by 550 days.

(21) Appl. No.: 11/363,892

(22) Filed: Feb. 27, 2006

(65) Prior Publication Data

US 2007/0201383 A1    Aug. 30, 2007

(51) Int. Cl.
*H04B 7/216* (2006.01)
*H04W 4/00* (2009.01)
(52) U.S. Cl. .................... 370/400; 370/320; 370/338
(58) Field of Classification Search ............... 370/276, 370/277, 278; 340/988, 996
See application file for complete search history.

(56) References Cited

U.S. PATENT DOCUMENTS

| | | | |
|---|---|---|---|
| 6,832,253 B1 * | 12/2004 | Auerbach | 709/226 |
| 2004/0054820 A1 * | 3/2004 | Karaoguz et al. | 710/8 |
| 2005/0018612 A1 * | 1/2005 | Fitzgerald | 370/248 |
| 2006/0205354 A1 * | 9/2006 | Pirzada et al. | 455/66.1 |
| 2006/0209719 A1 * | 9/2006 | Previdi et al. | 370/254 |
| 2006/0239455 A1 * | 10/2006 | Kato | 380/201 |
| 2007/0097880 A1 * | 5/2007 | Rajsic | 370/254 |
| 2007/0147283 A1 * | 6/2007 | Laroia et al. | 370/328 |

* cited by examiner

*Primary Examiner*—Chi H Pham
*Assistant Examiner*—Fan Ng
(74) *Attorney, Agent, or Firm*—Clements Bernard PLLC; Christopher L. Bernard; Tyler S. Brown

(57) ABSTRACT

Equipment generates a discovery message containing its address/node identification (ID) and/or other information. Adjacent equipment (e.g., physically adjacent equipment) monitors control overhead bytes (section trace (J0) bytes, Data Communication Channel (DCC) control overhead, General Communication Channel (GCC) control overhead, etc.) for this message, but does not generate a corresponding response message as called for in the standards/implementation agreements. Rather, it records the address/node ID and/or other information in order to identify its neighbor, and uses an alternative mechanism to either record the adjacency separately (e.g., at a Network Management System (NMS) in order to populate or verify its topology database) or communicate an out-of-band control message to the neighbor (e.g., using the received address/node ID as the destination address for the out-of-band control message, which carries its own address/node ID and link information). Such automated population and/or verification of node and/or NMS topology databases improves the speed and accuracy of network resource allocation.

30 Claims, 10 Drawing Sheets

DISCOVERY OF PHYSICALLY ADJACENT NEIGHBOR DEVICES USING A UNIDIRECTIONAL IN-BAND PROCESS COUPLED WITH AN OUT-OF-BAND FOLLOW-UP PROCESS

FIELD OF THE INVENTION

The present invention relates generally to the telecommunications and optical networking fields. More specifically, the present invention relates to the discovery of physically adjacent neighbor devices using a unidirectional in-band (in-fiber) process coupled with an out-of-band follow-up process.

BACKGROUND OF THE INVENTION

Discovery is the process whereby neighboring nodes on either side of a link automatically determine each others' identity and verify the connectivity between them. There can be "layer adjacency discovery" between nodes that have interfaces or switching capabilities at the same layer, and "physical adjacency discovery" between nodes that have interfaces or switching capabilities at different layers. Current International Telecommunications Union—Telecommunications Division (ITU-T) standards and Optical Internetworking Forum (OIF) implementation agreements define methods for layer adjacency discovery, wherein there is a bidirectional link available between neighboring nodes, using the control overhead bytes present in Synchronous Optical Network/Synchronous Digital Hierarchy (SONET/SDH) and Optical Transport Network (OTN) formatted links (see, for example, ITU-T Recommendations G.7714 and G.7714.1, and OIF User Network Interface (UNI) 1.0 Signaling Specification). Likewise, the Internet Engineering Task Force (IETF) defines a "link management protocol" that does not perform automatic discovery, as the Internet Protocol (IP) addresses of neighboring nodes must first be configured into the system, but that can be used after discovery, or with configured information, to exchange link capabilities and verify connectivity (see Internet Draft).

Thus, layer adjacency discovery is logically performed at a specific layer (i.e., discovery can be at the fiber wavelength or SONET path/line/section (OTN ODU/OTU) layers). While the provisioning of such information is not difficult, the provisioning process is typically a manual process with several steps that may lead to errors being incorporated into a topology database. Any method that increases the accuracy of the topology database is helpful to carriers, and an automated or partially-automated method is most useful.

ITU-T and OIF layer adjacency discovery methods rely on the existence of a bidirectional link between neighboring nodes at a specific layer and the availability of an in-band channel at that specific layer over which a discovery message can be sent, unimpeded by any equipment placed in between the neighboring nodes that operates at a different layer. SONET/SDH and OTN control overhead bytes are designed to be passed transparently by equipment at a lower layer (e.g., path overhead is passed transparently by line and section terminating equipment, line overhead is passed transparently by section terminating equipment, etc.). Certain fields, such as bit error monitoring bytes (BIP-8), are created based on the bit values in a frame, and if any information in the control overhead bytes is changed by intervening equipment, this either invalidates the bit error monitoring bytes (potentially causing an error indication) or requires that the intervening equipment modify the bit error monitoring bytes to correct for the change in the control overhead bytes.

If either a bidirectional link is not available or a peer relationship does not exist, standard discovery methods do not work. If neighboring nodes are not peers (i.e., do not operate at the same layer), then one endpoint may be able to write information into the control overhead bytes, but the other endpoint may not, as its role is normally to pass the control overhead bytes transparently. In particular, if a node which normally passes the control overhead bytes transparently is called upon to write information into the control overhead bytes, this disrupts the parity bits used for performance monitoring on the frame and an intervening node may have to recalculate the parity bits. This may also result in a false performance monitoring reading at the node terminating the frame. If only a unidirectional link is available, only one node will receive its neighbor's identity.

This makes it complex and costly for equipment to use standard discovery methods if the equipment is not operating at a peer layer, since equipment operating at a lower layer cannot modify overhead by inserting its own address and information without correspondingly recalculating the bit error monitoring bytes. Moreover, equipment operating at a lower layer cannot be designed to insert information into overhead, since this is not a standard function. Monitoring the contents of overhead, however, is a useful function and can be used to determine, for example, the performance of a transported signal.

Thus, what is needed in the art is an automated discovery method for equipment that does not operate at a peer layer and, as a result, cannot perform bidirectional interaction using control overhead bytes to detect the address/identity of a physically adjacent node. What is also needed in the art is a method for using out-of-band protocol messages, such as Link Management Protocol (LMP) messages (or other protocol messages as defined in the ITU-T standards for link capability exchange), to allow equipment to carry its own address/node identification (ID) and link information back to the physically adjacent node. A method for the authentication of the received out-of-band message is desirable in order to ensure that the received out-of-band message was generated by an actual neighboring node, since out-of-band messages can presumably be received from any node connected to the same control network.

BRIEF SUMMARY OF THE INVENTION

In accordance with the methods and systems of the present invention, equipment generates a discovery message containing its address/node ID and/or other information, such as link information. Adjacent equipment (e.g., physically adjacent equipment) monitors control overhead bytes (section trace (J0) bytes, Data Communication Channel (DCC) control overhead, General Communication Channel (GCC) control overhead, etc.) for this message, but does not generate a corresponding response message as called for in the standards/implementation agreements. Rather, it records the address/node ID and/or other information in order to identify its neighbor, and uses an alternative mechanism to either record the adjacency separately (e.g., at a Network Management System (NMS) in order to populate or verify its topology database) or communicate an out-of-band control message to the neighbor (e.g., using the received address/node ID as the destination address for the out-of-band control message, which carries its own address/node ID and link information). Such automated population and/or verification of node and/or NMS topology databases improves the speed and accuracy of network resource allocation.

In this manner, automated discovery is possible for equipment that does not operate at a peer layer and, as a result, cannot perform bidirectional interaction using control overhead bytes. Advantageously, automated discovery is possible with minimal complexity and cost. The methods and systems of the present invention also provide an out-of-band follow-up method using LMP messages (or other protocol messages as defined in the ITU-T standards for link capability exchange) as the format for carrying address/node ID and link information back to a physically adjacent node. As described above, a method for the authentication of the received out-of-band control message is desirable in order to ensure that the received out-of-band control message was generated by an actual neighboring node, since out-of-band control messages can presumably be received from any node connected to the same control network.

In one exemplary embodiment of the present invention, a unidirectional in-band and out-of-band follow-up method for discovering physically adjacent neighbor devices in a telecommunications network includes, at a first device, generating an in-band discovery message including identification information related to the first device; at a second device, receiving the in-band discovery message including the identification information related to the first device and recognizing the first device as a neighbor device; and, from the second device, communicating the identification information related to the first device to a network management system via an out-of-band communication. The method also includes, from the second device, communicating identification information related to the second device to the network management system via an out-of-band communication. The method further includes, from the network management system, communicating the identification information related to the second device to the first device via an out-of-band communication. The in-band discovery message including the identification information related to the first device consists of one of section trace (J0) bytes, Data Communication Channel (DCC) control overhead, and General Communication Channel (GCC) control overhead. Optionally, the second device includes a tunable filter and a receiver collectively operable for selectively receiving the in-band discovery message including the identification information related to the first device. The method still further includes, at the network management system, populating a topology database with the information related to the first device. The method still further includes, from the network management system, communicating one or more of the identification information related to the first device and identification information related to the second device to one or more other devices via one or more out-of-band communications. The identification information related to the first device includes one or more of a contact address, node identification information, node capability information, and link connectivity information. The identification information related to the second device includes one or more of a contact address, node identification information, node capability information, link connectivity information, and an out-of-band discovery message. The method still further includes, at the first device, receiving the identification information related to the second device and recognizing the second device as a neighbor device. Finally, the method includes, at the network management system, populating a topology database with the information related to the second device.

In another exemplary embodiment of the present invention, a unidirectional in-band and out-of-band follow-up method for discovering physically adjacent neighbor devices in a telecommunications network includes, at a first device, generating an in-band discovery message including identification information related to the first device; at a second device, receiving the in-band discovery message including the identification information related to the first device and recognizing the first device as a neighbor device; from the second device, communicating the identification information related to the first device to a network management system via an out-of-band communication; from the second device, communicating identification information related to the second device to the network management system via an out-of-band communication; from the network management system, communicating the identification information related to the second device to the first device via an out-of-band communication; and, at the first device, receiving the identification information related to the second device and recognizing the second device as a neighbor device. The in-band discovery message including the identification information related to the first device consists of one of section trace (J0) bytes, Data Communication Channel (DCC) control overhead, and General Communication Channel (GCC) control overhead. Optionally, the second device includes a tunable filter and a receiver collectively operable for selectively receiving the in-band discovery message including the identification information related to the first device. The method also includes, at the network management system, populating a topology database with the information related to the first device. The method further includes, from the network management system, communicating one or more of the identification information related to the first device and identification information related to the second device to one or more other devices via one or more out-of-band communications. The identification information related to the first device includes one or more of a contact address, node identification information, node capability information, and link connectivity information. The identification information related to the second device includes one or more of a contact address, node identification information, node capability information, link connectivity information, and an out-of-band discovery message. The method still further includes, at the network management system, populating a topology database with the information related to the second device.

In a further exemplary embodiment of the present invention, a unidirectional in-band and out-of-band follow-up system for discovering physically adjacent neighbor devices in a telecommunications network includes a first device operable for generating an in-band discovery message including identification information related to the first device; and a second device operable for receiving the in-band discovery message including the identification information related to the first device and recognizing the first device as a neighbor device, wherein the second device is further operable for communicating the identification information related to the first device to a network management system via an out-of-band communication. The second device is further operable for communicating identification information related to the second device to the network management system via an out-of-band communication. The network management system is operable for communicating the identification information related to the second device to the first device via an out-of-band communication. The in-band discovery message including the identification information related to the first device consists of one of section trace (J0) bytes, Data Communication Channel (DCC) control overhead, and General Communication Channel (GCC) control overhead. Optionally, the second device includes a tunable filter and a receiver collectively operable for selectively receiving the in-band discovery message including the identification information related to the first device. The network management system is also operable for populating a topology database with the information related to the first device. The network management system is further operable for communicating one or more of the identification information related to the first device and identification information related to the second device to one or more other devices via one or more out-of-band communications. The identification information related to the first device includes one or more of a contact address, node identification information, node capability information, and link connectivity information. The identification information related to the second device includes one or more of a contact address, node identification information, node capability information, link connectivity information, and an out-of-band discovery message. The first device is further operable for receiving the identification information related to the second device and recognizing the second device as a neighbor device. The network management system is still further operable for populating a topology database with the information related to the second device.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
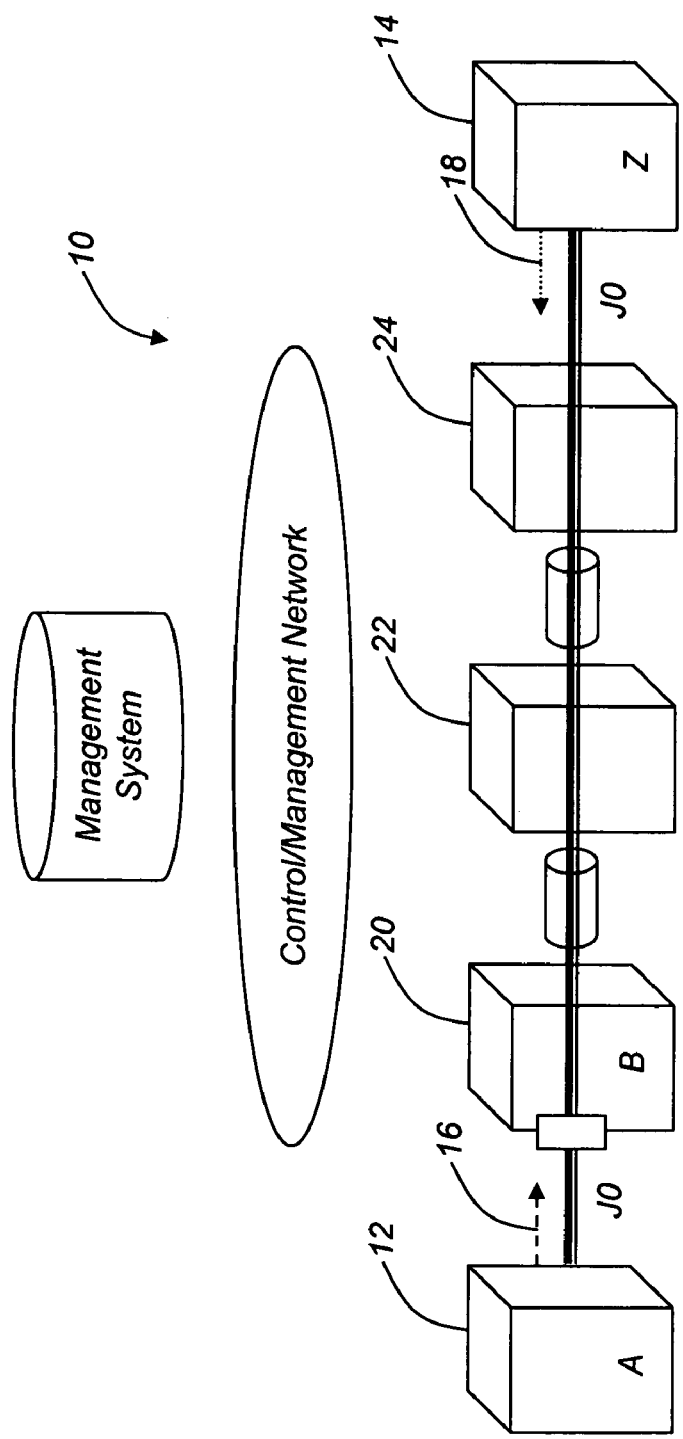
FIG. 1 is a schematic diagram illustrating a conventional in-band discovery process that is designed to work between peer entities, as defined in the ITU-T standards and OIF implementation agreements.

Referring to FIG. 1, illustrating a conventional in-band discovery process 10 that is designed to work between peer entities, as defined in the ITU-T standards and OIF implementation agreements, originating point A 12 and terminating point Z 14 generate discovery messages 16,18, respectively, that are sent over the J0 byte, DCC, GCC, or other control overhead in the connecting link. Intermediate nodes 20,22,24 that are transparent to this control overhead (i.e., that transport the discovery messages 16,18 to/from the originating point A 12 and terminating point Z 14 transparently) do not participate in the discovery process 10 and are not automatically discovered by originating point A 12 and terminating point Z 14, nor do they automatically discover that originating point A 12 and terminating point Z 14 are neighbors. They may, however, through IP identification, be capable of identifying neighbors at their own layer.

Figure 2:
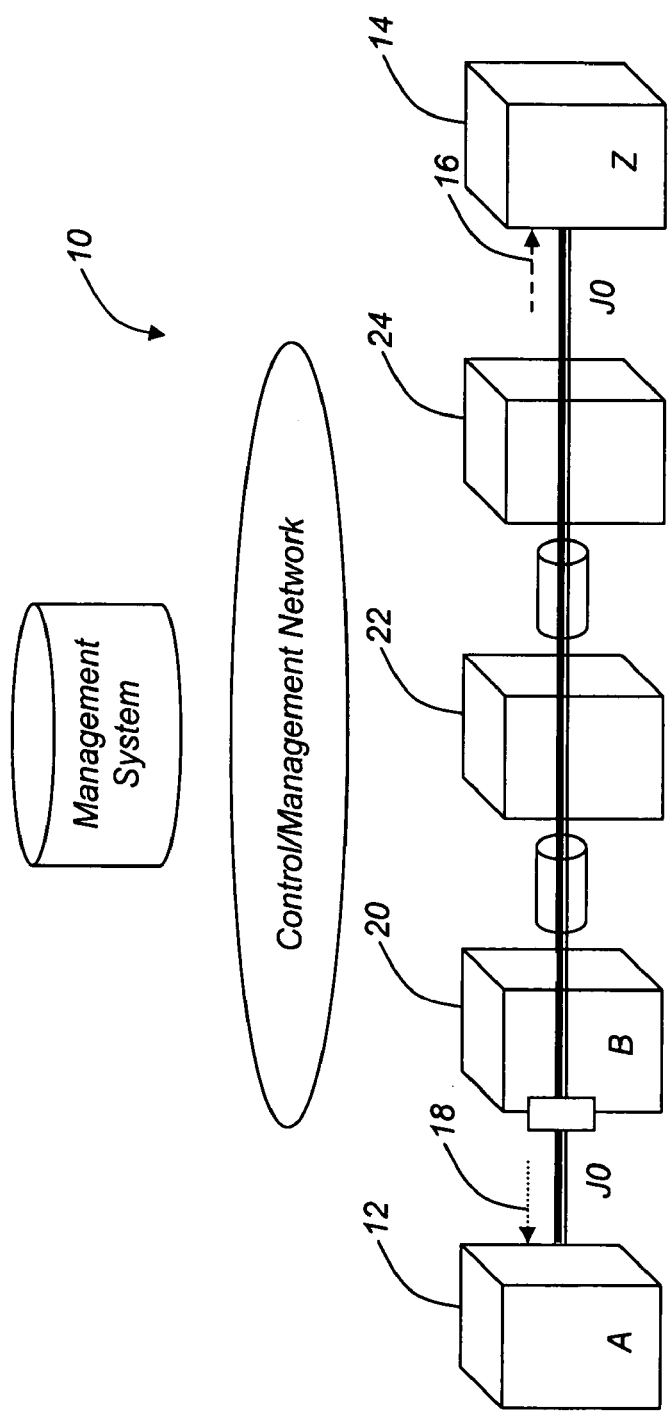
FIG. 2 is another schematic diagram illustrating the conventional in-band discovery process that is designed to work between peer entities, as defined in the ITU-T standards and OIF implementation agreements.

Referring to FIG. 2, also illustrating the conventional in-band discovery process that is designed to work between peer entities, as defined in the ITU-T standards and OIF implementation agreements, originating point A 12 and terminating point Z 14 receive the discovery messages 16,18 and are thus able to determine that they are neighbors, as well as to ascertain the others' identity and contact address.

Figure 3:
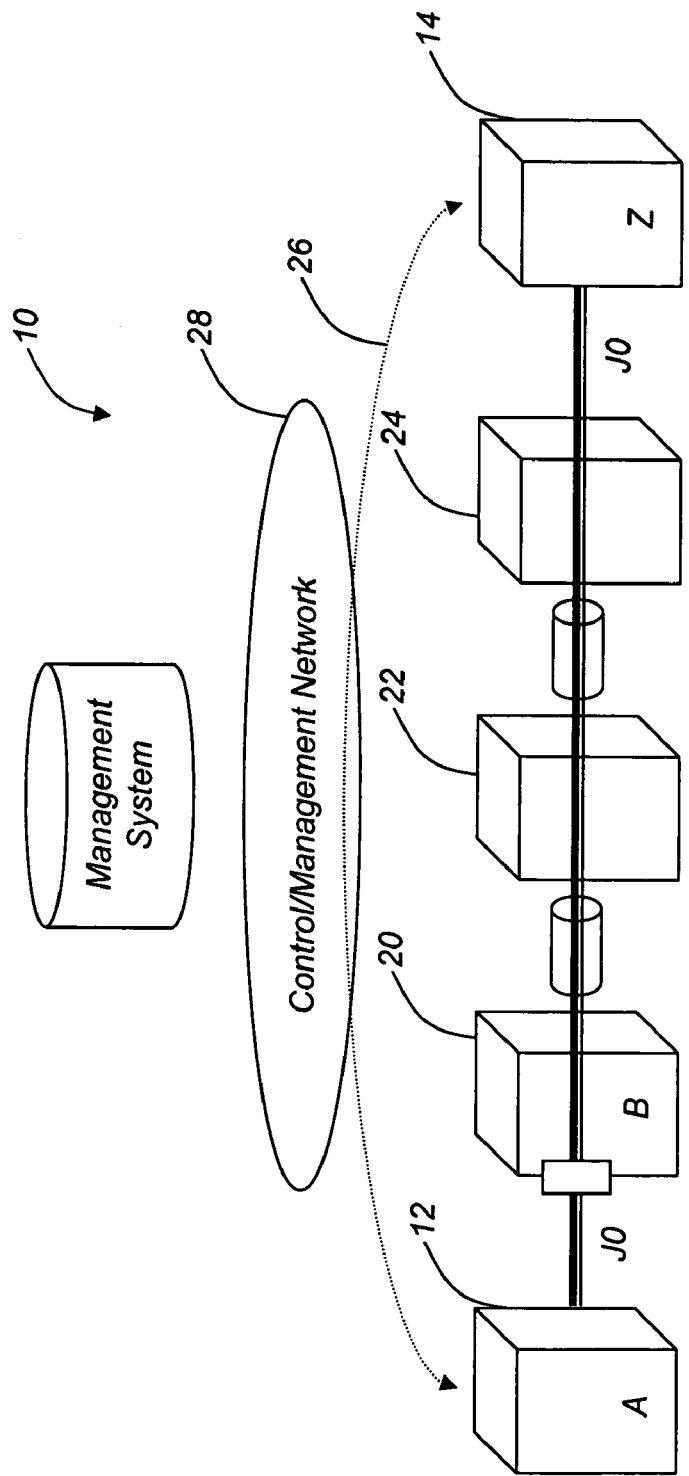
FIG. 3 is a further schematic diagram illustrating the conventional in-band discovery process that is designed to work between peer entities, as defined in the ITU-T standards and OIF implementation agreements.

Referring to FIG. 3, further illustrating the conventional in-band discovery process that is designed to work between peer entities, as defined in the ITU-T standards and OIF implementation agreements, originating point A 12 and terminating point Z 14 subsequently exchange messages supporting link capability exchange, still to be defined in the standards and implementation agreements. A bidirectional control path is assumed, either via in-band control overhead or an out-of-band network 26,28.

Figure 4:
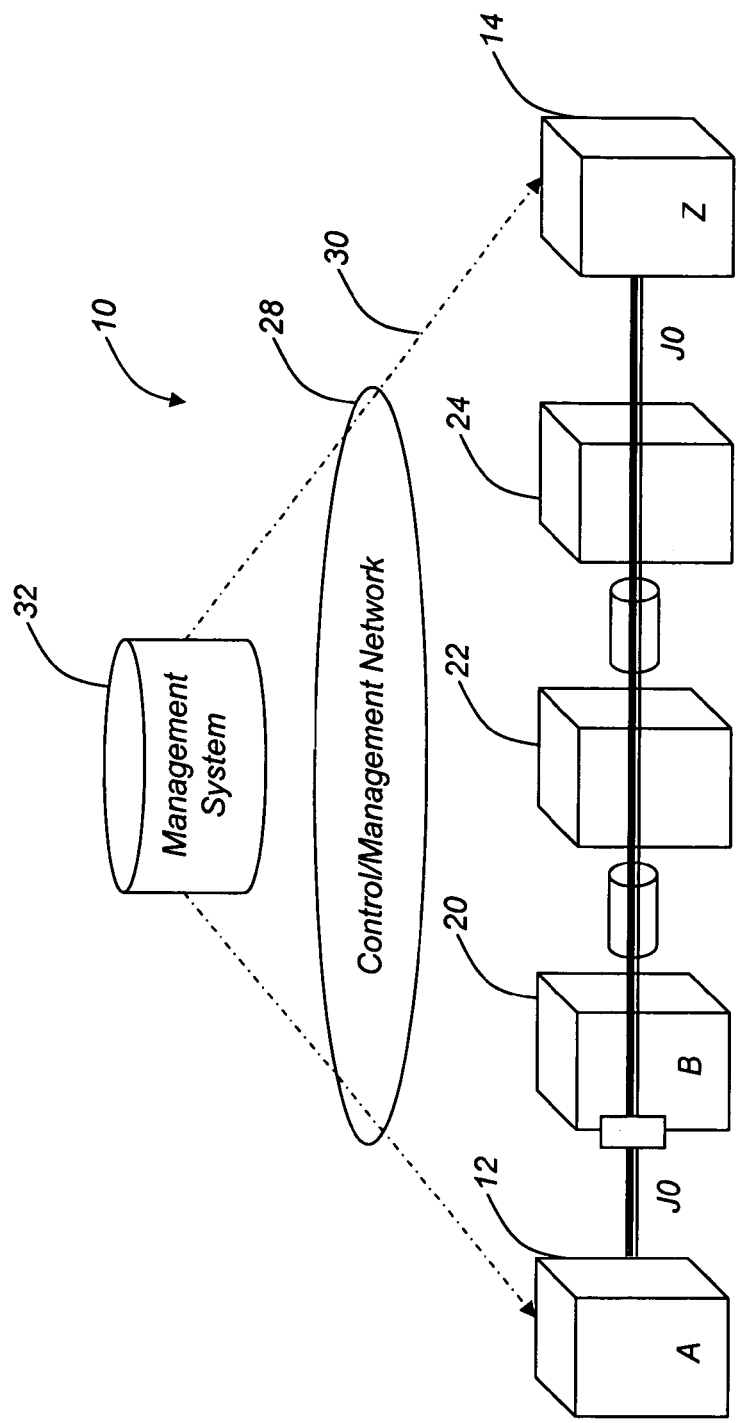
FIG. 4 is a schematic diagram illustrating a conventional out-of-band discovery or verification process, as defined in the IETF specifications.

Referring to FIG. 4, illustrating a conventional out-of-band discovery or verification process, as defined in the IETF specifications, neighboring devices do not "discover" each others' identity and contact address, but, rather, are pre-provisioned with each others' identity and contact address. They subsequently use this information to exchange messages about each others' link capabilities. For example, originating point A 12 and terminating point Z 14 are pre-provisioned with each others' identity and contact address via a network interface 30 with a network management system 32.

Figure 5:
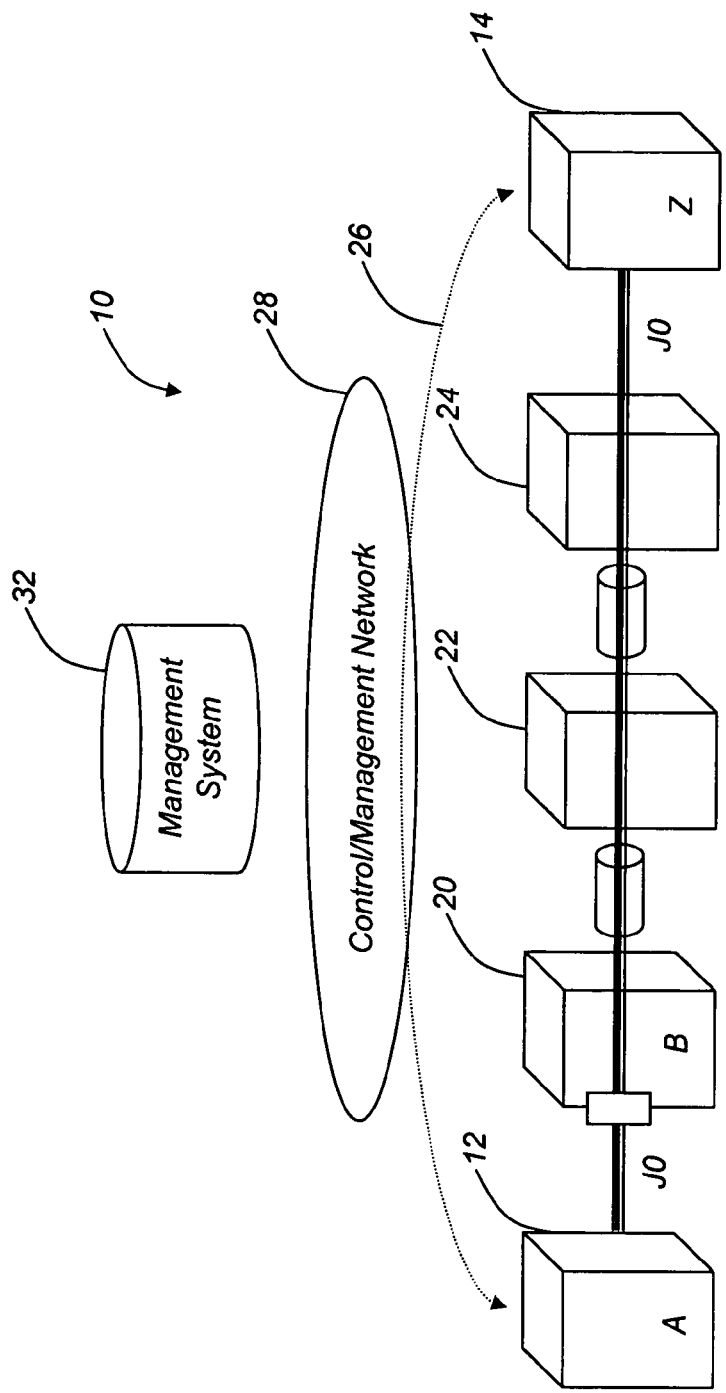
FIG. 5 is another schematic diagram illustrating the conventional out-of-band discovery or verification process, as defined in the IETF specifications.

Referring to FIG. 5, also illustrating the conventional out-of-band discovery or verification process, as defined in the IETF specifications, originating point A 12 and terminating point Z 14 subsequently exchange messages supporting link capability exchange, which are designed with the assumption that neighbor identity has already been configured into the end systems. A bidirectional control path is assumed, via an out-of-band network 26,28.

Figure 6:
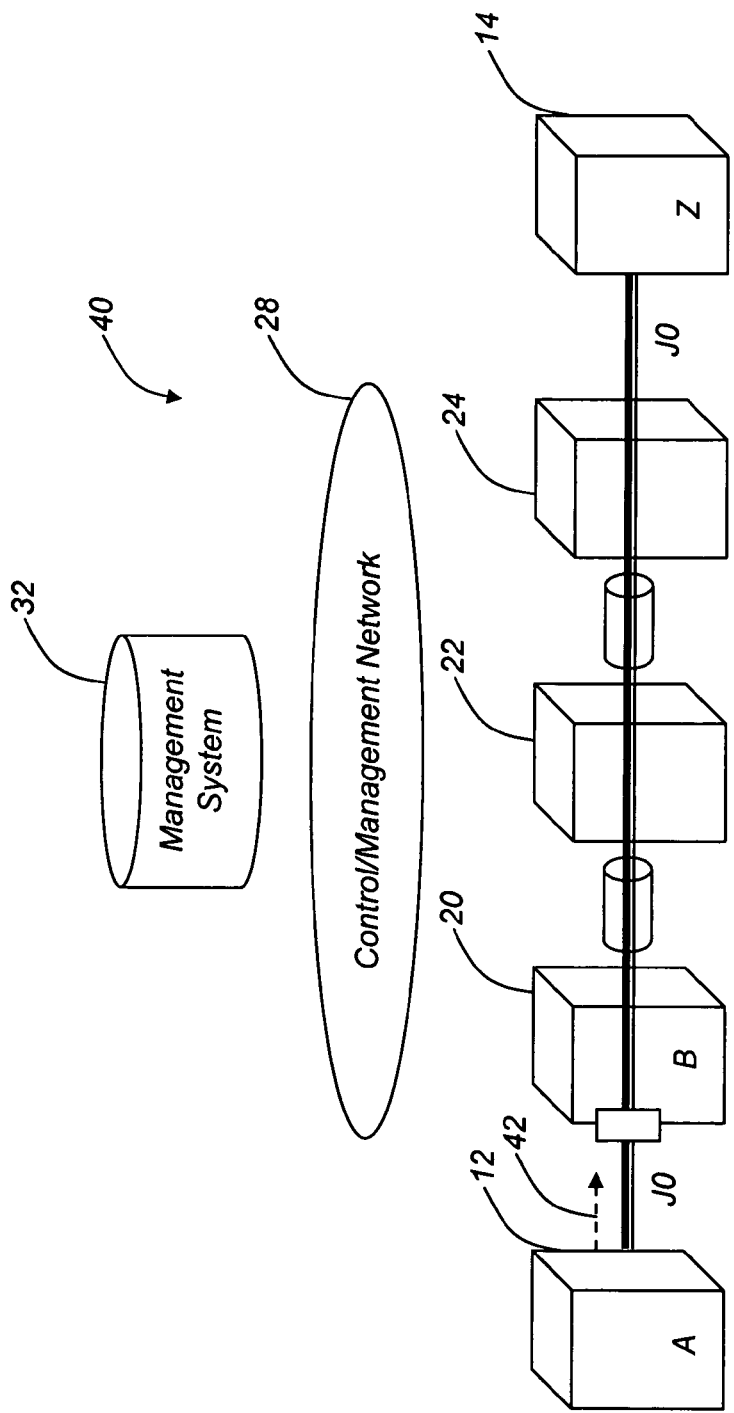
FIG. 6 is a schematic diagram illustrating one exemplary embodiment of the unidirectional in-band discovery process of the present invention, and specifically a SONET/SDH embodiment.

Referring to FIG. 6, illustrating one exemplary embodiment of the unidirectional in-band discovery process 40 of the present invention, and specifically a SONET/SDH embodiment, it is assumed that only a one-way in-fiber path is available between device A 12 and device B 20. This renders the discovery process described above (FIGS. 1-3) unusable, as this process requires a two-way in-fiber path for the exchange of discovery messages. However, a combination of a one-way in-fiber discovery message and subsequent out-of-band interaction can be used to perform neighbor discovery. Accordingly, device A 12 generates a J0 discovery message 42 containing its identity and device B 20 (an intermediate Dense Wavelength Division Multiplexing (DWDM) device, for example) monitors J0, thereby identifying device A 12 and recognizing it as its neighbor.

An exemplary discovery message consists of the following format: a 4 byte flag indicating that the message is a discovery message, an address/node ID for the source equipment, and a link or port identifier corresponding to the link endpoint at the source equipment. This is illustrated in Table 1.

TABLE 1

Exemplary Discovery Message

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Flag | | | | | | | | | | | | | | | | Address/Node ID | | | | | | | | | | Local Link/Port ID | | | | | |
| | | | | | | | | | | Address/Node ID cont'd | | | | | | | | | | | | | | | | | | | | | |
| | | | | | | | | | | Local Link/Port ID cont'd | | | | | | | | | | | | | | | | | | | | | |

Figure 7:
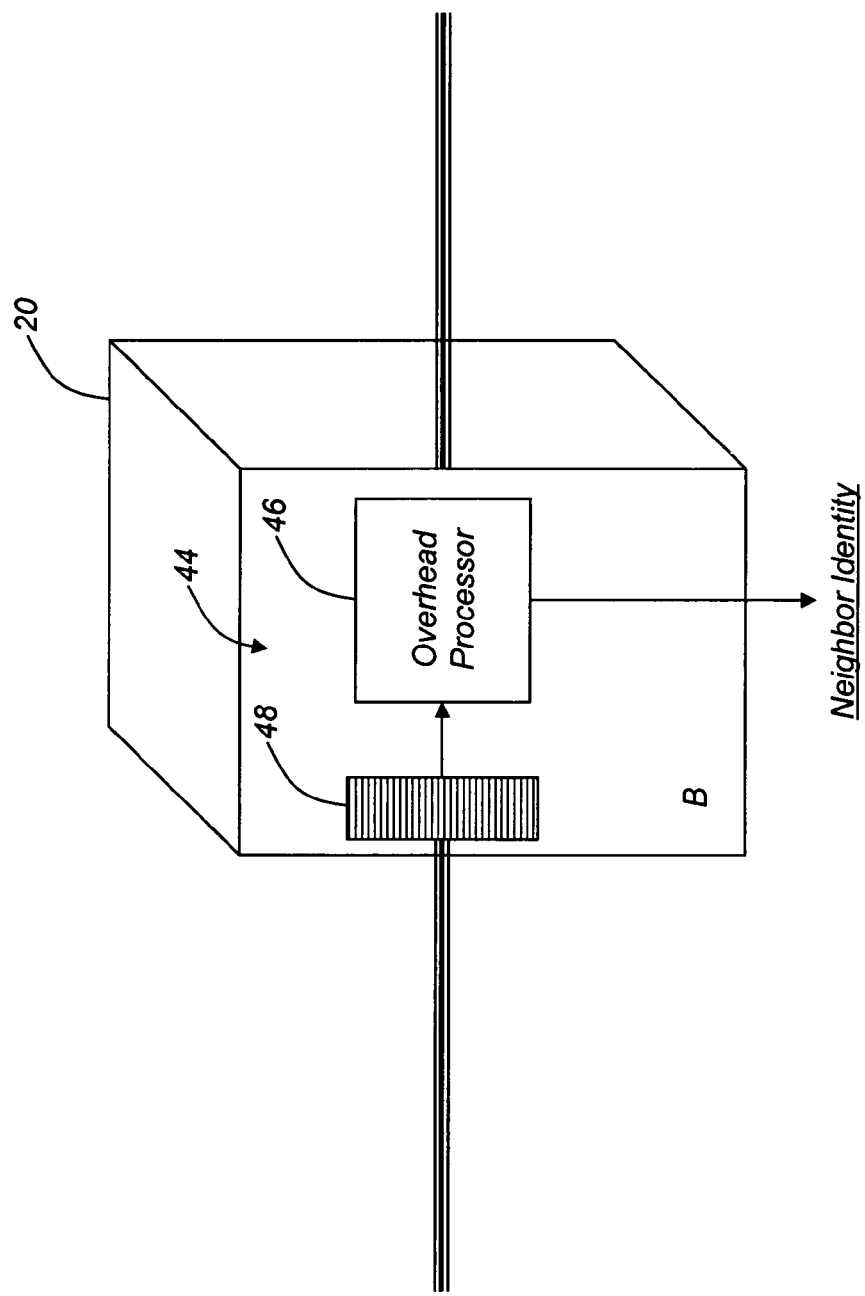
FIG. 7 is a schematic diagram illustrating one exemplary embodiment of a filter/receiver assembly that is optionally utilized by the unidirectional in-band discovery process of the present invention.

Referring to FIG. 7, illustrating one exemplary embodiment of a filter/receiver assembly 44 that is optionally utilized by the unidirectional in-band discovery process of the present invention, the monitoring of J0 or other overhead bytes is only possible if device B 20 has access to these bytes. This is typically not true of Select Optical Add/Drop Multiplexers (S-OADMs) and Reconfigurable Optical Add/Drop Multiplexers (R-OADMs), which treat received input as a transparent photonic signal. However, it is possible to equip such devices with the ability to "snoop" on an input port, using a receiver 46 preceded by a tunable filter 48. The tunable filter 48 is used to scan the input port, lock on any signal present, and snoop on the J0 or other overhead bytes that are present in the signal. Because a tunable filter 48 is used, this can be done for one or multiple signals in a multi-wavelength photonic link between domains. In order to perform such snooping without affecting the transmission of the received signal requires splitting the signal, sending one copy through the filter/receiver assembly 44, and adding the other copy to the DWDM signal, as per the normal operation of the S-OADM or R-OADM.

Figure 8:
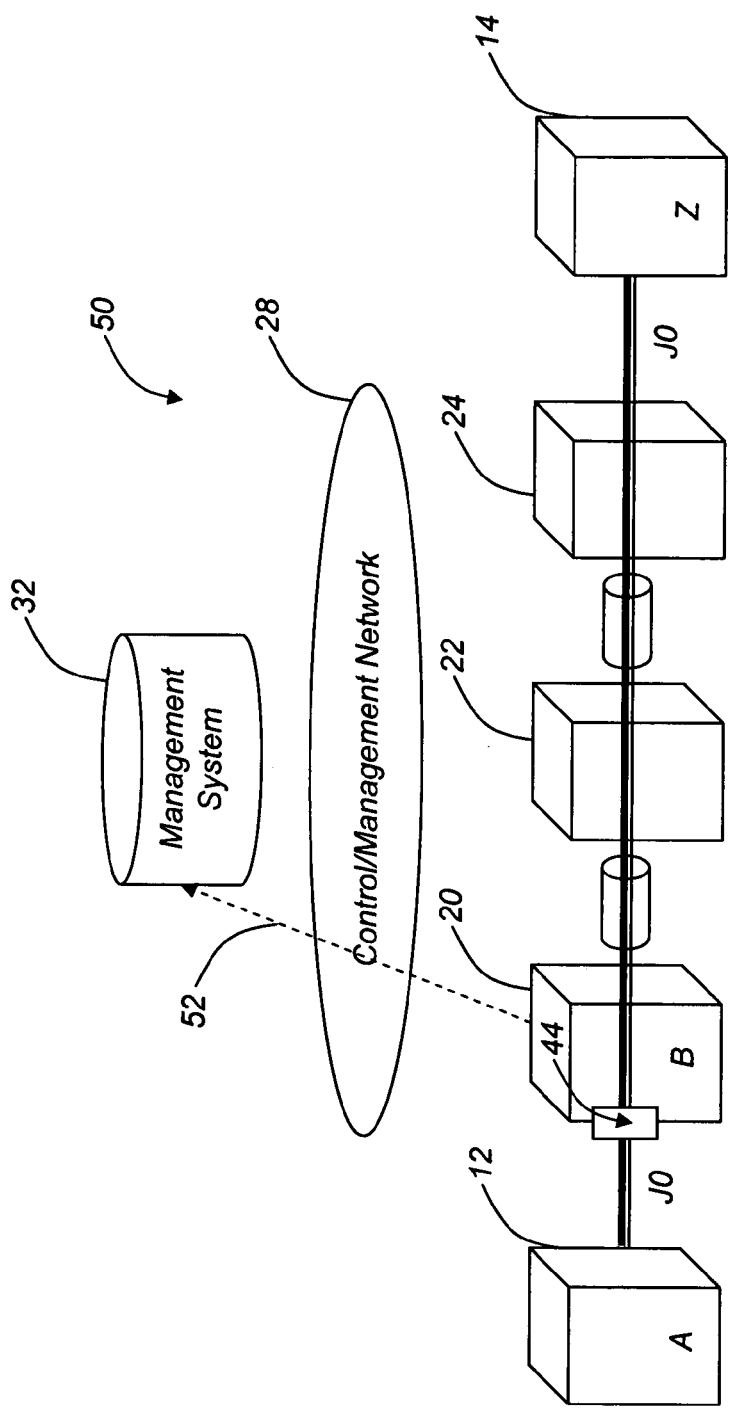
FIG. 8 is a schematic diagram illustrating one exemplary embodiment of the out-of-band follow-up process of the present invention, and specifically a SONET/SDH embodiment.

Referring to FIG. 8, illustrating one exemplary embodiment of the out-of-band follow-up process 50 of the present invention, and specifically a SONET/SDH embodiment, the neighbor identity of device A 12 is passed to the network management system 32 via a network interface 52. At this point, it is possible to stop the discovery process and use the information mined for network management purposes (i.e., to populate the topology database of the network management systems 32, etc.). Subsequently, if needed, the network management system 32 can notify device A 12 of its neighbor's identity. However, it may also be desirable to continue a distributed process to notify device A 12 of its neighbor's identity via out-of-band control messaging, thus enabling interactions to, for example, exchange link information and verify link connectivity.

Figure 9:
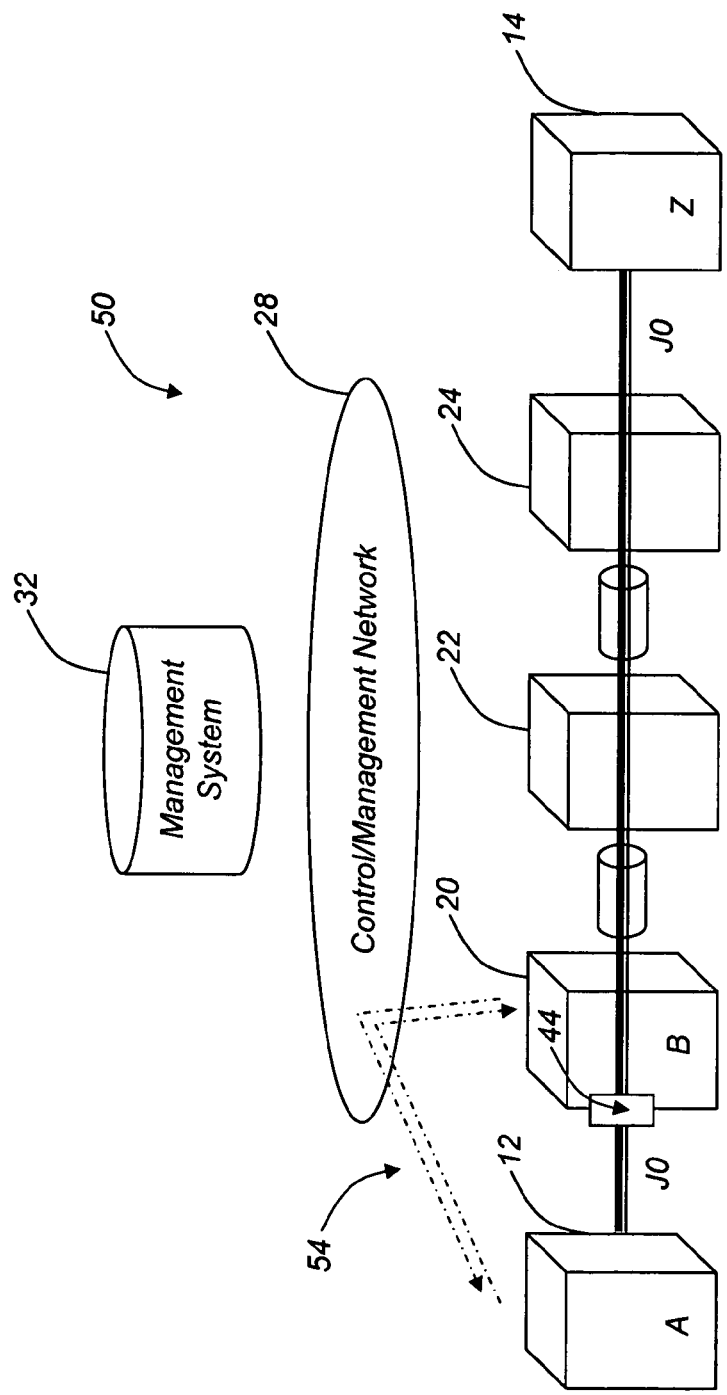
FIG. 9 is another schematic diagram illustrating the out-of-band follow-up process of the present invention, and specifically the SONET/SDH embodiment.

Referring to FIG. 9, also illustrating the out-of-band follow-up process 50 of the present invention, and specifically the SONET/SDH embodiment, an out-of-band discovery message 54 is sent from device B 20 to device A 12 through the control/management network 28, given that device B 20 determines the network address of device A 12 from the J0 discovery message 42 (FIG. 6). At this point, originating device A 12 determines that its physically adjacent neighbor is DWDM device B 20. Device A 12 and device B 20 can then exchange information about the link that connects them, as well as information about their respective capabilities, using out-of-band messaging.

A typical set of control/management network processes operates as follows: both device A 12 and device B 20 are connected to the same control/management network 28, or to different control/management networks through a router; device A 12 and device B 20 each support limited control/management network capabilities, including the knowledge of where to send messages for a given network address (e.g., to a default router for the control/management network 28); until device A 12 and device B 20 are known to be physically adjacent neighbors, there may be no communication between them using the control/management network 28; once device B 20 detects that device A 12 is its physically adjacent neighbor, it initiates a control session with device A 12, which consists of an initial HELLO message informing device A 12 of its neighbor B 20 and subsequent session configuration messages providing details of the control session, such as the frequency of keep-alive messages and alternate addresses that may be used; and device B 20 and device A 12 exchange link information, such as the link ID used locally to identify the link in question, the type of switching supported by the sending node (e.g., device A 12 may indicate SONET/SDH, while device B 20 may indicate DWDM or wavelength granularity), and any other link characteristics, such as protection mechanisms, supported by the link.

Thus, in accordance with the methods and systems of the present invention, equipment generates a discovery message containing its address/node ID and/or other information. Adjacent equipment (e.g., physically adjacent equipment) monitors control overhead bytes (J0 bytes, DCC control overhead, GCC control overhead, etc.) for this message, but does not generate a corresponding response message as called for in the standards/implementation agreements. Rather, it records the address/node ID and/or other information in order to identify its neighbor, and uses an alternative mechanism to either record the adjacency separately (e.g., at a NMS in order to populate or verify its topology database) or communicate an out-of-band control message to the neighbor (e.g., using the received address/node ID as the destination address for the out-of-band control message, which carries its own address/node ID and link information). Such automated population and/or verification of node and/or NMS topology databases improves the speed and accuracy of network resource allocation.

Figure 10:
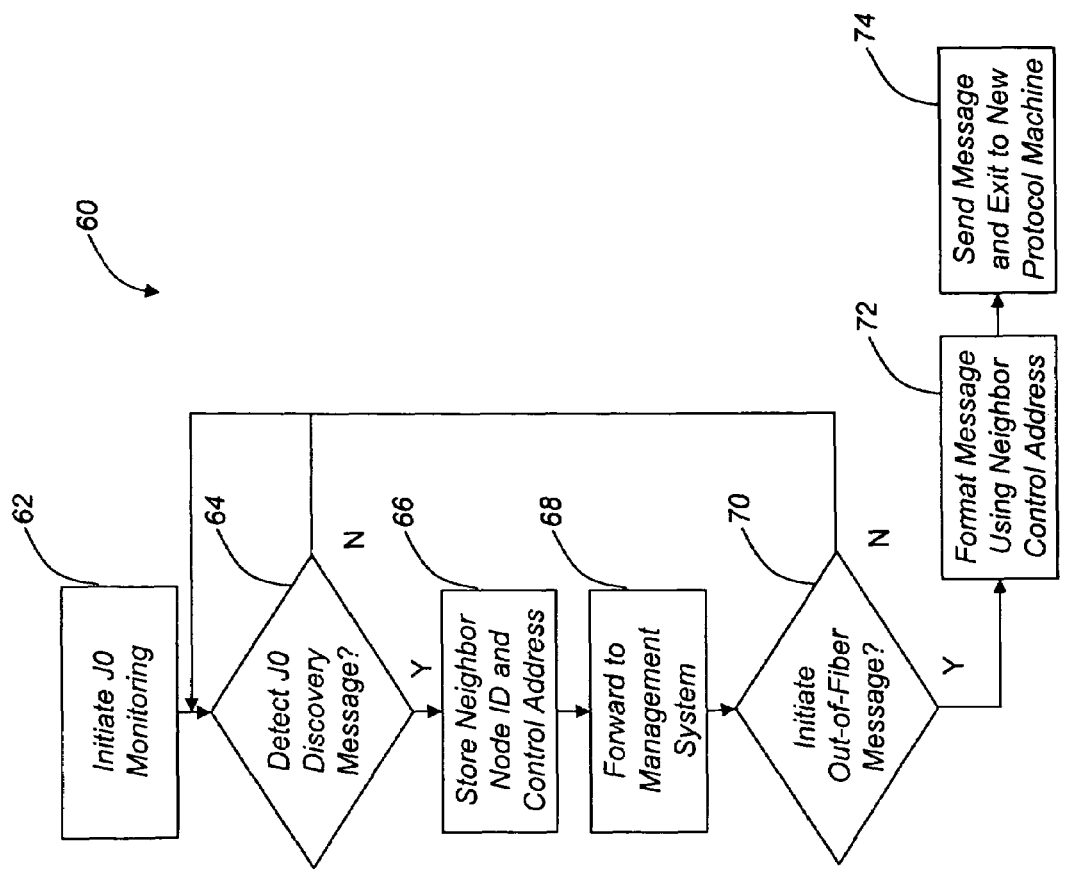
FIG. 10 is a flowchart illustrating one exemplary embodiment of the unidirectional in-band discovery and out-of-band follow-up processes of the present invention.

This process 60 is illustrated in the flowchart of FIG. 10. First, J0 monitoring is initiated 62. Second, if a J0 discovery message is detected 64, the neighbor's node ID and control address are stored 66. If not, J0 monitoring continues 62. Third, the neighbor's node ID and control address are forwarded to the management system 68. Fourth, an out-of-fiber message is either initiated or not 70. If so, the message is formatted using the neighbor's control address 72. If not, J0 monitoring continues 62. Finally, the message is sent and the process is exited to a new protocol machine 74.

In this manner, automated discovery is possible for equipment that does not operate at a peer layer and, as a result, cannot perform bidirectional interaction using control overhead bytes. Advantageously, automated discovery is possible with minimal complexity and cost. The methods and systems of the present invention also provide an out-of-band follow-up method using LMP messages (or other protocol messages as defined in the ITU-T standards for link capability exchange) as the format for carrying address/node ID and link information. As described above, a method for the authentication of the received out-of-band control message is desirable in order to ensure that the received out-of-band control message was generated by an actual neighboring node, since out-of-band control messages can presumably be received from any node connected to the same control network.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A unidirectional in-band and out-of-band follow-up method for discovering physically adjacent neighbor devices in a telecommunications network, the method comprising:
   at a first device, generating an in-band discovery message as part of data traffic in a network comprising identification information related to the first device;
   at a second device, receiving the in-band discovery message comprising the identification information related to the first device and recognizing the first device as a neighbor device; and
   from the second device, communicating the identification information related to the first device to a network management system via an out-of-band communication separate from the data traffic, and separate from the network, wherein the out-of-band communication from the second device to the network management system is utilized in place of a corresponding in-band response message from the second device to the first device as called for in standards/implementation agreements.

2. The method of claim 1, further comprising, from the second device, communicating identification information related to the second device to the network management system via an out-of-band communication.

3. The method of claim 2, further comprising, from the network management system, communicating the identification information related to the second device to the first device via an out-of-band communication.

4. The method of claim 3, further comprising, at the first device, receiving the identification information related to the second device and recognizing the second device as a neighbor device.

5. The method of claim 2, wherein the identification information related to the second device comprises one or more of a contact address, node identification information, node capability information, link connectivity information, and an out-of-band discovery message.

6. The method of claim 2, further comprising, at the network management system, populating a topology database with the information related to the second device.

7. The method of claim 1, wherein the in-band discovery message comprising the identification information related to the first device comprises one of section trace (J0) bytes, Data Communication Channel (DCC) control overhead, and General Communication Channel (GCC) control overhead.

8. The method of claim 1, wherein the second device comprises a tunable filter and a receiver collectively operable for selectively receiving the in-band discovery message comprising the identification information related to the first device.

9. The method of claim 1, further comprising, at the network management system, populating a topology database with the information related to the first device.

10. The method of claim 1, further comprising, from the network management system, communicating one or more of the identification information related to the first device and identification information related to the second device to one or more other devices via one or more out-of-band communications.

11. The method of claim 1, wherein the identification information related to the first device comprises one or more of a contact address, node identification information, node capability information, and link connectivity information.

12. A unidirectional in-band and out-of-band follow-up method for discovering physically adjacent neighbor devices in a telecommunications network, the method comprising:
   at a first device, generating an in-band discovery message as part of data traffic in a network comprising identification information related to the first device;
   at a second device, receiving the in-band discovery message comprising the identification information related to the first device and recognizing the first device as a neighbor device;
   from the second device, communicating the identification information related to the first device to a network management system via an out-of-band communication separate from the data traffic, and separate from the network, wherein the out-of-band communication from the second device to the network management system is utilized in place of a corresponding in-band response message from the second device to the first device as called for in standards/implementation agreements;
   from the second device, communicating identification information related to the second device to the network management system via an out-of-band communication, wherein the out-of-band communication from the second device to the network management system is utilized in place of a corresponding in-band response message from the second device to the first device as called for in standards/implementation agreements;
   from the network management system, communicating the identification information related to the second device to the first device via an out-of-band communication; and
   at the first device, receiving the identification information related to the second device and recognizing the second device as a neighbor device.

13. The method of claim 12, wherein the in-band discovery message comprising the identification information related to the first device comprises one of section trace (J0) bytes, Data Communication Channel (DCC) control overhead, and General Communication Channel (GCC) control overhead.

14. The method of claim 12, wherein the second device comprises a tunable filter and a receiver collectively operable for selectively receiving the in-band discovery message comprising the identification information related to the first device.

15. The method of claim 12, further comprising, at the network management system, populating a topology database with the information related to the first device.

16. The method of claim 12, further comprising, from the network management system, communicating one or more of the identification information related to the first device and identification information related to the second device to one or more other devices via one or more out-of-band communications.

17. The method of claim 12, wherein the identification information related to the first device comprises one or more of a contact address, node identification information, node capability information, and link connectivity information.

18. The method of claim 12, wherein the identification information related to the second device comprises one or more of a contact address, node identification information, node capability information, link connectivity information, and an out-of-band discovery message.

19. The method of claim 12, further comprising, at the network management system, populating a topology database with the information related to the second device.

20. A unidirectional in-band and out-of-band follow-up system for discovering physically adjacent neighbor devices in a telecommunications network, the system comprising:
a first device operable for generating an in-band discovery message as part of data traffic in a network comprising identification information related to the first device; and
a second device operable for receiving the in-band discovery message comprising the identification information related to the first device and recognizing the first device as a neighbor device,
wherein the second device is further operable for communicating the identification information related to the first device to a network management system via an out-of-band communication separate from the data traffic, and separate from the network, wherein the out-of-band communication from the second device to the network management system is utilized in place of a corresponding in-band response message from the second device to the first device as called for in standards/implementation agreements.

21. The system of claim 20, wherein the second device is further configured for communicating identification information related to the second device to the network management system via an out-of-band communication.

22. The system of claim 21, wherein the network management system is configured for communicating the identification information related to the second device to the first device via an out-of-band communication.

23. The system of claim 22, wherein the first device is further configured for receiving the identification information related to the second device and recognizing the second device as a neighbor device.

24. The system of claim 21, wherein the identification information related to the second device comprises one or more of a contact address, node identification information, node capability information, link connectivity information, and an out-of-band discovery message.

25. The system of claim 21, wherein the network management system is configured for populating a topology database with the information related to the second device.

26. The system of claim 20, wherein the in-band discovery message comprising the identification information related to the first device comprises one of section trace (J0) bytes, Data Communication Channel (DCC) control overhead, and General Communication Channel (GCC) control overhead.

27. The system of claim 20, wherein the second device comprises a tunable filter and a receiver collectively operable for selectively receiving the in-band discovery message comprising the identification information related to the first device.

28. The system of claim 20, wherein the network management system is configured for populating a topology database with the information related to the first device.

29. The system of claim 20, wherein the network management system is configured for communicating one or more of the identification information related to the first device and identification information related to the second device to one or more other devices via one or more out-of-band communications.

30. The system of claim 20, wherein the identification information related to the first device comprises one or more of a contact address, node identification information, node capability information, and link connectivity information.

* * * * *